United States Patent
Koning et al.

Patent Number: 5,999,517
Date of Patent: Dec. 7, 1999

[54] SUMMARIZATION OF ROUTING INFORMATION IN A HIERARCHICAL NETWORK

[75] Inventors: G. Paul Koning, Wilton, N.H.; Ken Benstead, Shrewsbury, Mass.

[73] Assignee: 3Com Corporation, Santa Clara, Calif.

[21] Appl. No.: 09/042,161

[22] Filed: Mar. 13, 1998

[51] Int. Cl.$^6$ .................................................. H04Q 11/00
[52] U.S. Cl. ........................... 370/255; 370/235; 370/351
[58] Field of Search ..................... 370/235, 255, 370/256, 348, 351, 356, 461, 539

[56] References Cited

U.S. PATENT DOCUMENTS

| | | | |
|---|---|---|---|
| 5,521,910 | 5/1996 | Matthews | 370/256 |
| 5,831,982 | 11/1998 | Hummel | 370/351 |
| 5,854,899 | 12/1998 | Callon et al. | 370/235 |

OTHER PUBLICATIONS

"Private Network–Network Interface Specification Version 1.0 (PPNI1.0)," The ATM Forum Technical Committee, af–pnni–0055.00, Mar. 1996.

Primary Examiner—Douglas W. Olms
Assistant Examiner—Shick Hom
Attorney, Agent, or Firm—McGlew and Tuttle, P.C.

[57] ABSTRACT

The plurality of nodes in a computer network is divided into a plurality of peer groups. The plurality of peer groups can further be divided into a plurality of upper level peer groups. Routing information for each peer group is summarized according to an algorithm. This summary routing information is then stored in nodes which are not a member of that peer group. The algorithm for summarizing the routing information, represents each peer group as a summary node where nodes of the peer group which connect to other peer groups, are considered ports of the summary node. Metric values for the characteristics of paths connecting these ports are determined. A metric average is computed for all of the port-to-port paths and this average is then halved to give a peer default metric value for a routing path entering into, or exiting from that particular peer group. An exception method can be included, if a particular port has a significantly different metric value for entering into or exiting the peer group from that port. Also a bypass metric can be included in the summarization information if a particular path between ports of the peer group has a metric value which is significantly different from the peer default metric value.

21 Claims, 4 Drawing Sheets

| Source/Dest | 1 | 2 | 3 | 4 | 5 | 6 |
|---|---|---|---|---|---|---|
| 1 | N/A | 2 | 8 | 6 | 2 | 8 |
| 2 | 9 | N/A | 2 | 2 | 6 | 15 |
| 3 | 11 | 6 | N/A | 9 | 6 | 5 |
| 4 | 6 | 4 | 19 | N/A | 17 | 8 |
| 5 | 9 | 8 | 3 | 14 | N/A | 20 |
| 6 | 7 | 5 | 11 | 9 | 3 | N/A |

Fig. 4

SUMMARIZATION OF ROUTING INFORMATION IN A HIERARCHICAL NETWORK

FIELD OF THE INVENTION

The present invention relates to computer networks with a plurality of possible routing paths between first and second nodes, and in particular to computer networks where the nodes and links are arranged in a hierarchical layers.

BACKGROUND OF THE INVENTION

In computer networks a plurality of nodes are connected by a plurality of links. Often the connection of links and nodes is not orderly, symmetrical or follows an established pattern. Also there is often a plurality of possible routing paths between a first and second node. Methods are known to determine a plurality of routing paths in such disorganized networks. When a plurality of routing paths are available, one path needs to be selected for the actual data transmission. The choice of the actual path is often based on characteristics of the different paths. Metric values are used to represent the characteristics of a path, and each path often contains a plurality of different links and nodes which have different metric values for the characteristics that are important in selecting a routing path. A metric value is determined for each characteristic of each path by combining the metric values of each link and node in the path. This metric combining in this document will be referred to as "metrically adding". However depending on the characteristic, the combining of metric values is not always by simple mathematical addition. When the characteristic is time delay or distance, the time delay or distance for each link and node is simply added. When the characteristic is a data rate type characteristic, the metric value for the path is the lowest data rate of the links and nodes. When a characteristic is similar to a standard deviation of noise, the standard deviation of noise for a routing path is a more complicated combination or addition of the standard noise deviations of the individual links and nodes.

When the number of nodes and links in a computer network is relatively small, each node can store the metric values for all the links and nodes in the network. When a node wishes to communicate with another node, a plurality of routing paths are determined and the node calculates the metric values for the different characteristics of each routing path by metrically adding the metric values for the individual characteristics of each link and node in the path. When the number of links and nodes in a computer network is relatively large, it becomes impossible, or at least impractical, for a node to store all the metric values of all the links and nodes in the network. Instead of limiting the size of the network, it has been proposed to layer the network in a hierarchical manner.

In a layered network, a group of nodes and the links connecting those nodes are formed into a peer group. A computer network can then have a plurality of peer groups. Each node in a peer group contains actual information for the links and nodes in its own peer group. The node only contains summary information for other peer groups to which it does not belong. In this way, each node does not need to store large amounts of routing information and simplifies the routing process.

For the hierarchical layering of computer networks to operate properly, the summarization of the routing information for other peer group's must reasonably reflect the routing properties of the peer group being summarized, while substantially reducing the amount of information needed to describe that peer group. Typically summarization methods have been "and-hoc" or "heuristic" in nature.

SUMMARY AND OBJECTS OF THE INVENTION

The primary object of the present invention is to provide an algorithmic approach to summarization of routing information in a hierarchical network. It is a further object of the present invention to reduce the amount of routing information that a node needs to store and manage, while still reasonably and accurately reflecting the routing properties of the portions of the network which have been summarized.

The present invention is very beneficially applied to the hierarchical representation or layering of computer networks based on the "Complex Node Representation" in the ATM Forum specification, "Private Network-Network Interface Specification Version 1.0 (PNNI 1.0)", af-pnni-0055.000, March 1996 which is hereby incorporated by reference.

The present invention accomplishes these objectives by algorithmically determining an estimated peer default metric value for the entering and exiting of a peer group by a routing path. The peer group is considered to be, or modeled as, a summary node and treated as a node with metric values for all of the characteristics which are need to select one of the best routing paths. The summary node has peer default metric values for entering the summary node or peer group, and usually the same peer default metric value for exiting the peer group. Each node is provided with the peer default metric values for peer groups other than its own.

When an origination node needs to decide which of a plurality of routing paths to choose, the origination node calculates the path metric values for each of the paths. The node first starts by metrically adding the metric values for all nodes and links of the path in the peer group of the origination node. The origination node then determines which other peer groups the path enters and metrically adds the peer default metric values of those peer groups to the path metric value. The origination node also determines which peer groups the path exits, and metrically adds the peer default metric values for those peer groups to the path metric values.

The peer default metric values are determined algorithmically by the forming of each peer group into a summary node. All links of nodes of the respective peer group which connect to other peer groups are described as ports of the summary node. Port-to-port routing paths are determined in the summary node along with the metric values for these port-to-port routing paths. Metric values for each characteristic in these port-to-port routing paths are metrically averaged and then metrically halved to create the peer default metric values for entering and exiting the respective peer group.

Because of the composition of a particular peer group, the actual metric value for a single routing path through the peer group could be significantly different from the peer default metric values determined from averaging all the metric values for the port-to-port paths in the peer group. If more accuracy is desired in the summary information for a particular peer group, the summary information can include a bypass metric. Actual metric values for port-to-port paths in a peer group are compared to the peer default metric values. If the port-to-port metric values are significantly different, a bypass metric is formed for that peer group and for those particular ports. This bypass metric is then stored with the peer default metric values in the nodes of the other peer groups. When a node needs to calculate the path metric of a path, it determines if the path is passing through ports of a bypass path of another peer group. If the particular path is through the bypass path of another peer group, then the bypass metric is used instead of the peer default metric. If the particular path does not use the ports of the bypass, the peer default metric values are used.

Also because of the particular construction of a peer group, one port on a summary node can be significantly better or worse for entry into, or exit out of a peer group. If the metric value for all paths using a particular port of a summary node are averaged, and this particular port average differs significantly from the peer default metric values for entering and exiting the node, that particular port of the peer group is known to have an exception metric. To more accurately represent that particular peer group, the exception metric is stored with the peer default metric values for that peer group in the nodes of other peer groups.

When a node calculates a path metric value, the node determines if the path uses a port with an exception metric in another peer group. If the path does use a port with an exception metric, the node calculates the path metric by using the exception metric of that peer group, instead of the peer default metric for that peer group. If the routing path does not go through a port with an exception metric, or a bypass metric, the node calculating the path metric then uses the peer default metric.

In computer networks, a routing path need not be bidirectional. Communication between two nodes can occur over a first path for data transfer from a first node to a second node, and data transfer from the second node to the first node can occur over a second different path. Also, particularly in Asynchronous Transfer Mode (ATM), characteristics of the nodes and links can be different depending on the direction of the data transfer through the node or link. If the characteristics are asymmetrical, then metric values need to be stored and separately calculated in each direction.

By grouping the links and nodes into peer groups, and treating each peer group as a summary node, the present invention summarizes the routing information of each peer group algorithmically to reduce the amount of routing information that needs to be stored and managed, while simultaneously maintaining a sufficient amount of accuracy.

In extremely large networks, it is also possible to combine a plurality of summary nodes into an upper level peer group. This upper level peer group is then formed into an upper level summary node in the same way as the original nodes were formed into a summary node. Peer default metric values, bypass metrics and exception metrics are then determined for these upper level summary nodes. If a node determines that a routing path extends through an upper level summary node or upper level peer group, the upper level peer default metric, the bypass metric or the exception metric of the upper level node is used depending on the path through the upper level summary node. In this way, an ever expanding computer network is still able to be summarized by hierarchically increasing the level of peer groups and summary nodes.

The determination of whether a port-to-port path through a peer group is significantly different to be a bypass, or if all the port-to-port paths through a particular port of a summary node are significantly different to be an exception matrix, can be decided by a predetermined criteria such as percentage difference, absolute difference, etc., and/or significant change as defined depending on the type of characteristic and the operation of the computer network. In an ATM network it can be based upon the concept of "significant change" as described in the PNNI document. It is also possible to vary the actual size of the percentage difference or threshold depending on the amount of routing information that can be stored in the nodes of the network. If the nodes of the network have large storage capacity, or there are a relatively small number of peer groups, the criteria can be adjusted so that relatively small differences between actual port-to-port path metrics and the default metrics qualify for exception and bypass metrics. If the number of peer groups increases, or the amount of storage in the nodes decreases, the criteria for determining exception and bypass metrics can be increased to reduce the number of bypass and exception metrics that need to be stored.

The summation of the present invention provides a method by which routing information can be algorithmically summarized, thus automating the summarization for routing information in large networks and reducing manual effort. The algorithmic approach also provides a consistent summarization which increases the accuracy of the summarization in the network. The summarization of the present invention therefore allows for the creation of new peer groups, and upper level peer groups, along with the updating of existing peer groups, without having to have a system administrator separately determining summarization information for each new peer, or updated, group. The creation of new or updated peer groups is therefore simpler in design, easier to produce and networks having additional peer groups are easier to operate.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a table of port-to-port metrics of a summary node.

DESCRIPTION OF THE PREFERRED EMBODIMENT

Figure 1:
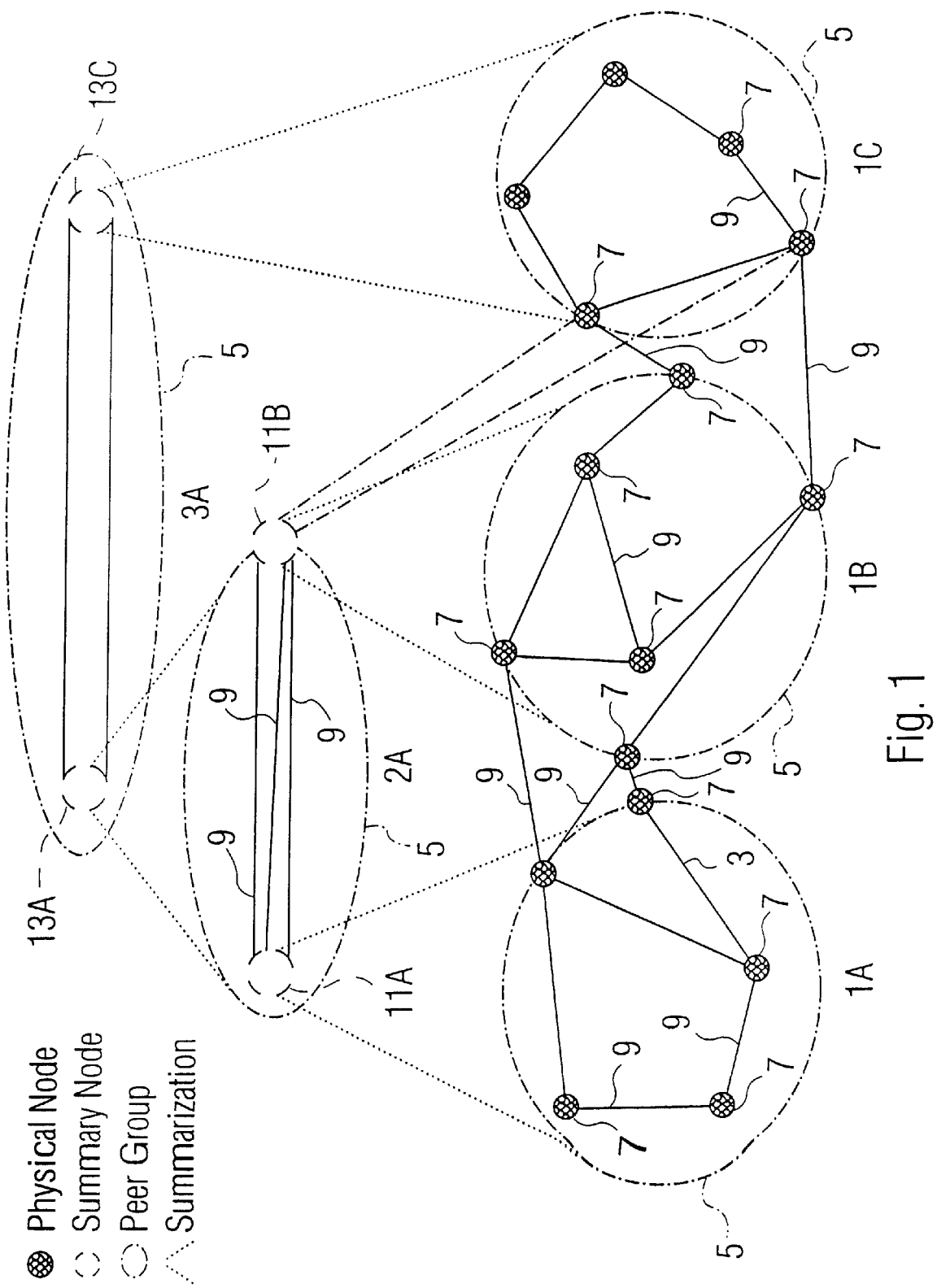
FIG. 1 is a plurality of nodes and links grouped into peer groups.

Referring to the figures, and in particular to FIG. 1, actual computer hardware nodes 7 are represented by the black dots and have physical links 9 connecting the hardware nodes 7 and providing paths for data transmission between the nodes 7. The node 7 represents actual physical hardware that participates in routing functions and carries network traffic. Switches and routers are common examples of nodes.

The function of routing is to select a path through a network that optimizes one or more characteristics of the network. For example it might be desirable to minimize the time for data to traverse the path or perhaps it might be desirable to maximize an administratively specified value along the path. The characteristic(s) that can be optimized, (either to be largest or smallest), are known as metrics. Every link 9 and every node 7 in a network has a value for each type of metric the network supports. When following a path through a network the metrics of all the links and nodes traversed are algorithmically combined to produce the metrics for the entire path, (i.e. the "path metrics"). The routing function looks at all suitable paths to find the path with the "best" value for the metric or metrics it is using. The routing function can allow different metrics to be optimized on different paths.

The actual physical computer nodes 7 and links 9 all have values for the metrics being supported. All of the other broken line nodes and links in FIG. 1 are abstractions used to represent the organization of the nodes and links 7,9 into peer groups 5. The broken lines represent a summarized form of the real network.

The physical links 9 and nodes 7 have been grouped into three peer groups 5, namely 1A, 1B and 1C. The links and nodes inside 1A are summarized and represented at layer 2 by a summary node 11A in Peer Group 2A. Likewise, summary node 11B represents the links and nodes in peer group 1B. Peer Group 1C does not have a summary at layer 2 but instead has one at layer 3. The links between peer group 1A and 1B have not been summarized and appear at layer 2 between the summary nodes 11A and 11B. Similarly the links between peer groups 1B and 1C are not summarized and appear between upper level summary nodes 13A and 13C.

The summary nodes 11A, 11B and links 9 in upper level peer group 2A are again summarized into a single upper level node 13A at layer 3. The links between peer groups 2A and 1C, i.e. those between 1B and 1C, now appear between the upper level summary nodes 13A and 13C at layer 3. In actual practice there can be many more layers of summarization.

Figure 2:
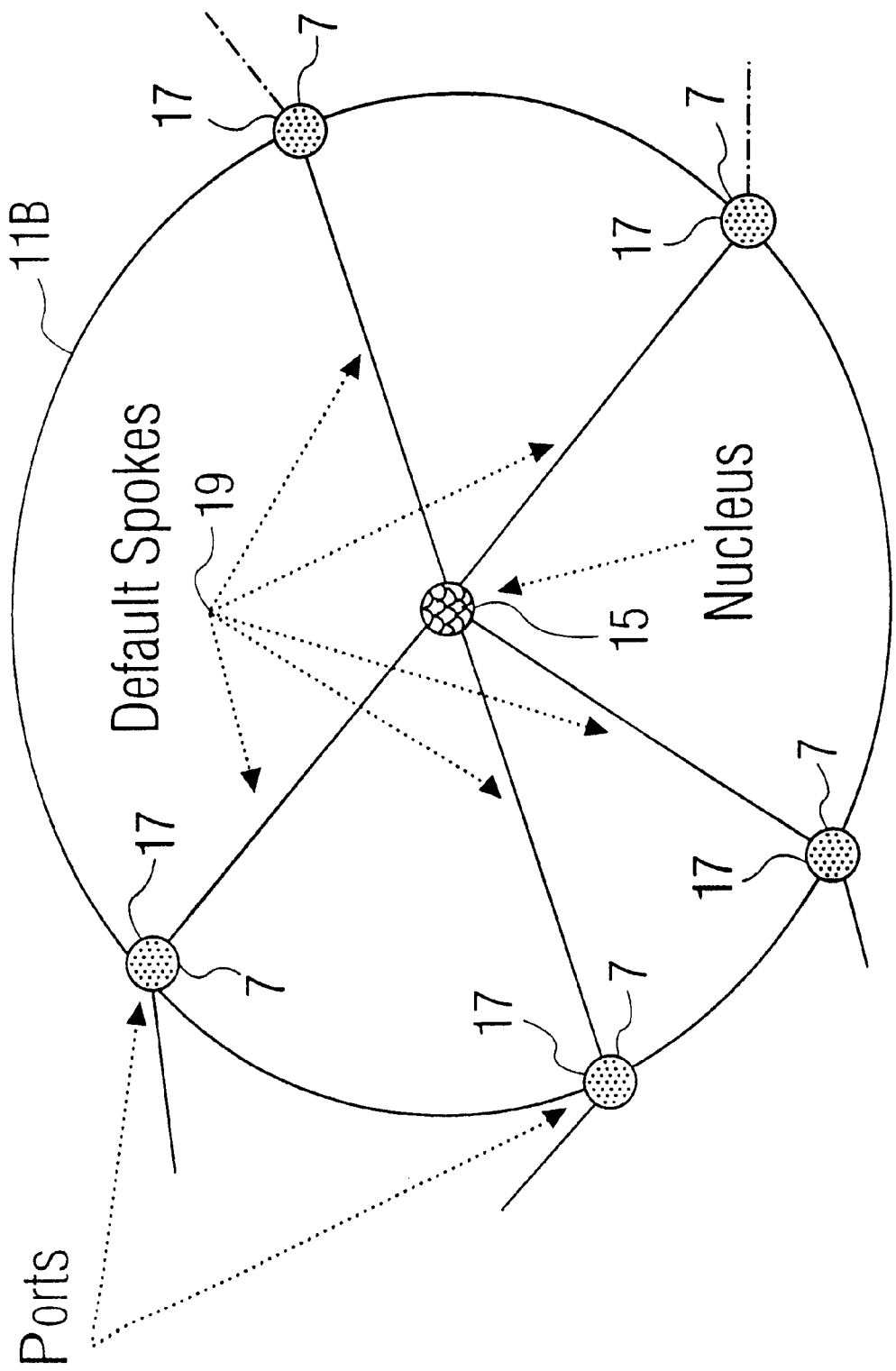
FIG. 2 is a schematic view of a summary node.

While physical nodes 7 may have fairly simple characteristics, e.g. same value of metrics between any two ports, summary nodes must be able to represent different metric values between different ports. The present invention models summary nodes in a manner somewhat similar to actual physical nodes. FIG. 2 is a view of how a summary node is modeled, and in particular for the summary node 11B representing Peer Group 1B. The basic principals are the same for all summary nodes. At the "center" of the representation or model is a special internal node of the summary node known as a nucleus 15. It has the characteristic in the model of having no metrics so that the combined metric of any path when it leaves the nucleus 15 is the same as just before it entered the nucleus. On the edge of the summary node are summary ports 17 which are those points where the summary node 11B or peer group 1B connects to other peer groups 5 via physical links 9. Ports 17, like the nucleus 15 have no metrics. Radiating from the nucleus 15 to each of the ports 17 are summary links known as default spokes 19. The default spokes 19 and nucleus 15 represent all the nodes 7 and links 9 of the corresponding peer group 1B which connect the respective ports 17. Default spokes 19 have values for each metric supported and those values apply in both directions of travel on the spoke 19. All default spokes in one summary node have identical metric values. Thus a routing path through the summary node will pass over two identical default spokes 19 and the nucleus 15. The resulting metrics with be metrically twice the peer default metrics of a default spoke 19.

Figure 3:
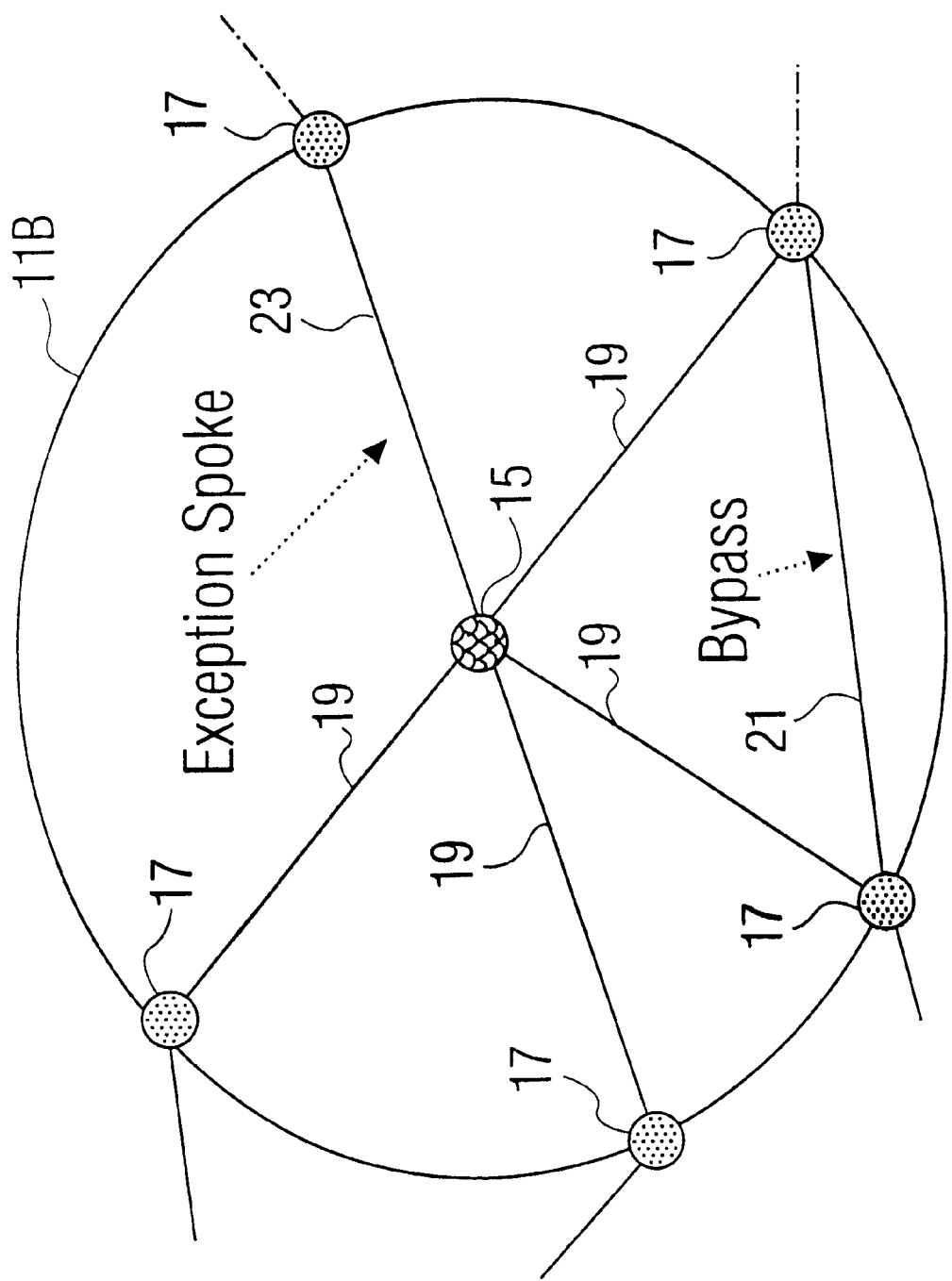
FIG. 3 is a schematic view of another summary node.

To improve the accuracy of this representation it is possible to override the value of a metric, in a particular direction, of a default spoke. Such an override is called an exception spoke 23, as shown in FIG. 3. In addition it is also possible to specify a bypass path 21 between any two ports 17. A bypass path 21 has values for all supported metrics and may have different values for a metric depending on direction. FIG. 3 is a view of an exception spoke 23 and a bypass 21 to the internal representation of Peer Group 1B.

In the present invention this representation is combined with an algorithmic summation to summarize the routing information in a peer group to those nodes in other peer groups.

Step 1 of the Algorithm

Calculate the optimal value of each metric, in each direction, between each pair of ports. Place the results for each metric in a separate matrix. FIG. 4, is a typical matrix for a metric. This amounts to performing a routing calculation, in the peer group being summarized, between each pair of ports for each metric and in each direction.

Step 2

Calculate the value of each metric of the Default Spoke by averaging all of the values in the metric's matrix, except those on the diagonal and call it $D_m$. Each resultant metric is metrically halved to become the metric of the default spoke 19 because two default spokes are traversed when crossing a summary node.

Step 3

Determine if there are any exception spokes 23 by calculating for each metric, the metric average of each row, (i.e. Source Port), of the metric's matrix, excluding the diagonal element, and call it $E_m$. If the result is significantly different from $D_m$ create an exception spoke 23 for that metric from the source port 17 to the nucleus 15. The value of the metric in the exception spoke is $E_m-(D_m/2)$. If the result is negative set the exception metric to zero. As already noted, the operations performed on metrics are not necessarily traditional arithmetic operations, therefore the setting to zero can be whatever the best or unchanged value would be. Significant difference between $D_m$ and $E_m$ can be determined in many ways, such as by percentage difference, absolute thresholds etcetera.

Step 4

Determine if there are any bypass paths 21 and their metric values. This is accomplished by checking, for each type of metric, if the value B in the matrix between each pair of ports 17 is significantly better than the sum of the metrics D between those ports, which may include "exceptions", called D. The metric B, is significantly better than the D, if it is more optimal than D and also significantly different from it. If the metric between a first and second port 17, called A and B, is significantly better call the metric $B_{ab}$. Then create a bypass path 21 between the first port 17 i.e. A, and the second port 17 i.e. B, with $B_{ab}$ as the value of the metric from the first to second port 17. The metric for the opposite direction is set to the matrix value from the second port to the first port namely $B_{ba}$.

The metric values for the default spokes, the exception spokes, and the bypass paths are considered the summary information of the peer group. Each node has this summary information for all peer groups to which is does not belong. When a node needs to calculate a path metric, for a routing path that travels through other peer groups, the node uses the peer default metrics for the default spokes, the exception metric or bypass metric, depending on the routing path in the corresponding peer groups to determine the metrics for those corresponding portions.

The default spokes 19, the exception spokes 23 and the bypass paths 21 are also determined for any upper level summary nodes such as 13a and 13b. The originating node of the routing path, also determines if the routing path travels through any of the upper level nodes, and uses the metrics of the upper level nodes for those portions of the upper level nodes to which the routing path travels.

In this way, each node does not need to store the metrics of all links and nodes in the network, and summary routing metric information can be automatically determined for each peer group.

The present invention is not limited to computer networks using the ATM protocol, but to all network protocols, where peer type groups are formed in a hierarchal manner.

The features described in specification, drawings, abstract, and claims, can be used individually and in arbitrary combinations for practicing the present invention.

While specific embodiments of the invention have been shown and described in detail to illustrate the application of the principles of the invention, it will be understood that the invention may be embodied otherwise without departing from such principles.

What is claimed is:

1. A method of summarization of routing information in a hierarchical network, the method comprising the steps of:
providing a plurality of nodes, each of said nodes having a metric value for data passing through a respective said node;
providing a plurality of links connecting said nodes, each of said links having a metric value for data passing through a respective said link,
dividing said plurality of nodes into a plurality of peer groups,
algorithmically determining an estimated peer default metric value for entering and exiting said each of said peer groups said estimated peer default metric value for said each of said peer groups being determined by forming said each of said peer groups into a summary node, identifying links of nodes of said respective peer group which connect to other said peer groups as ports of a respective said summary node, actual metric values for port-to-port routing paths connecting said ports of said summary node are determined, said actual metric values are metrically averaged and then metrically halved to create said peer default metric values for entering and exiting said respective peer group;
providing said each of said nodes with said metric values for said links and said nodes in said each of said peer groups;
providing said each node with said estimated peer default metric values for said peer groups other than said respective peer group.

2. The method in accordance with claim 1, wherein:
said actual metric values for said port-to-port paths are compared to said peer default metric value of a respective peer group, if said actual metric value for one of said port-to-port paths is different from said peer default metric value by a predetermined amount, said actual metric value for said one port-to-port path is a bypass metric, and said bypass metric is stored with said peer default metric values in said nodes of said peer groups other than said respective peer group.

3. The method in accordance with claim 2, wherein:
said actual metric value for said one port-to-port path is a bypass metric only if said actual metric value is better than said peer default metric value by a predetermined amount.

4. The method in accordance with claim 1, wherein:
said actual metric values for said port-to-port paths of a single port are metrically averaged to form $E_m$ and compared to said peer default values of a respective peer group, if said $E_m$ of said single port is different from said peer default metric value by a predetermined amount, an exception metric is assigned to routing paths that enter or leave said respective peer group though said single port, said exception metric is stored with said peer default metric values in said nodes of said peer groups other than said respective peer group.

5. The method in accordance with claim 4, wherein:
said actual metric values for said port-to-port paths are compared to said peer default metric value and any respective said exception metric of a respective port-to-port path, if said actual metric value for one of said port-to-port paths is different from said peer default metric value and said any respective exception metric by a predetermined amount, said actual metric value for said one port-to-port path is a bypass metric, and said bypass metric is stored with said peer default metric values in said nodes of said peer groups other than said respective peer group.

6. The method in accordance with claim 4, wherein:
a value of said exception metric is determined by subtracting said peer default metric value from said $E_m$.

7. The method in accordance with claim 6, wherein:
said value of said exception metric is set to zero if said subtracting results in a negative number.

8. The method in accordance with claim 1, wherein:
a plurality of upper level peer groups are formed from subsets of said peer groups;
an estimated upper level peer default metric value is determined for entering and exiting a respective said upper level peer group;
providing said each node with said estimated upper level peer default metric values for said upper level peer groups other than a respective upper level peer group.

9. The method in accordance with claim 1, wherein:
a plurality of upper level peer groups are formed from said summary nodes;
an estimated upper level peer default metric value is determined for entering and exiting a respective said upper level peer group;
providing said each node with said estimated upper level peer default metric values for said upper level peer groups other than a respective upper level peer group;
said upper level peer default metric value for each said upper level peer group is determined by forming said each upper level peer group into an upper level summary node, identifying links of nodes of said respective upper level peer group which connect to other said upper level peer groups as ports of a respective said upper level summary node, actual metric values for upper level port-to-port routing paths connecting said ports of said upper level summary node are determined, said actual metric values are metrically averaged and then metrically halved to create said upper level peer default metric values for entering and exiting said respective upper level peer group.

10. The method in accordance with claim 1, wherein:
said each node is provided with said metric values for said links connecting said peer groups.

11. A hierarchical network with summarized routing information, the network comprising:
a plurality of nodes, each of said nodes having a metric value for data passing through a respective said node;
a plurality of links connecting said nodes, each of said links having a metric value for data passing through a respective said link;
a plurality of peer groups, each peer group including a subset of said plurality of nodes, each said peer group having an algorithmically determined peer default metric value for entering into and exiting a respective said peer group, said peer default metric value for each of said peer groups is determined by forming said each of said peer groups into a summary node, nodes of said respective peer group which connect to other said peer groups are identified as ports of a respective said summary node, actual metric values for port-to-port routing paths connecting said ports of said summary node are determined, said actual metric values are metrically averaged and then metrically halved to create said peer default metric values for entering and exiting said respective peer group;

each said node having said metric values for said links and nodes in a respective said peer group, and said each node having said peer default metric values for said peer groups other than said respective peer group.

12. The network in accordance with claim 11, wherein:

said actual metric values for said port-to-port paths are compared to said peer default metric value of a respective peer group, if said actual metric value for one of said port-to-port paths is different from said peer default metric value by a predetermined amount, said actual metric value for said one port-to-port path is a bypass metric, and said bypass metric is stored with said peer default metric values in said nodes of said peer groups other than said respective peer group.

13. The network in accordance with claim 12, wherein:

said actual metric value for said one port-to-port path is a bypass metric only if said actual metric value is better than said peer default metric value by a predetermined amount.

14. The network in accordance with claim 11, wherein:

said actual metric values for said port-to-port paths of a single port are metrically averaged to form $E_m$ and compared to said peer default metric values of a respective peer group, if said $E_m$ of said single port is different from said peer default metric value by a predetermined amount, an exception metric is assigned to routing paths that enter or leave said respective peer group though said single port, said exception metric is stored with said peer default metric values in said nodes of said peer groups other than said respective peer group.

15. The network in accordance with claim 14, wherein:

a value of said exception metric is determined by subtracting said peer default metric value from said $E_m$.

16. The network in accordance with claim 15, wherein:

said value of said exception metric is set to zero if said subtracting results in a negative number.

17. The network in accordance with claim 11, wherein:

a plurality of upper level peer groups are formed from subsets of said peer groups;

an estimated upper level peer default metric value is determined for entering and exiting a respective said upper level peer group;

said each node is provided with said estimated upper level peer default metric values for said upper level peer groups other than a respective upper level peer group.

18. The network in accordance with claim 11, wherein:

a plurality of upper level peer groups are formed from summary nodes;

an estimated upper level peer default metric value is determined for entering and exiting a respective said upper level peer group;

said each node is provided with said estimated upper level peer default metric values for said upper level peer groups other than a respective upper level peer group;

said upper level peer default metric value for each said upper level peer group is determined by forming said each upper level peer group into an upper level summary node, identifying links of nodes of said respective upper level peer group which connect to other said upper level peer groups as ports of a respective said upper level summary node, actual metric values for upper level port-to-port routing paths connecting said ports of said upper level summary node are determined, said actual metric values are metrically averaged and then metrically halved to create said upper level peer default metric values for entering and exiting said respective upper level peer group.

19. The network in accordance with claim 10, said each node is provided with said metric values for said links connecting said peer groups.

20. A method for selecting one of a plurality of routing paths through a computer network, the method comprising the steps of:

providing a plurality of nodes, each of said nodes having a metric value for data passing through a respective said node;

providing a plurality of links connecting said nodes, each of said links having a metric value for data passing through a respective said link;

dividing said plurality of nodes into a plurality of peer groups;

determining an estimated peer default metric value for entering and exiting a respective peer group, said peer default metric value for each said peer group is determined by forming said each peer group into a summary node, identifying nodes of said respective peer group which connect to other said peer groups as ports of a respective said summary node, actual metric values for port-to-port routing paths connecting said ports of said summary node are determined, said actual metric values are metrically averaged and then metrically halved to create said peer default metric values for entering and exiting said respective peer group;

providing said each of said nodes with said metric values for said links and nodes in a respective said peer group;

providing said each node with said estimated peer default metric values for said peer groups other than said respective peer group;

determining a plurality of paths from a first node in a first peer group to a second node in a second peer group;

calculating a path metric value for each of said paths by metrically adding metric values for said links and nodes of said each of said paths in said first peer group and said peer default metric values for entrances and exits of said each of said paths into and out of other said peer groups;

comparing each said path metric value for said each of said paths with each other according to a predefined criteria to select one of said paths.

21. The method in accordance with claim 20, wherein:

said actual metric values for said port-to-port paths are compared to said peer default metric value of a respective peer group, if said actual metric value for one of said port-to-port paths is different from said peer default metric value by a predetermined amount, said actual metric value for said one port-to-port path is a bypass metric, and said bypass metric is stored with said peer default metric values in said nodes of said peer groups other than said respective peer group.

* * * * *